US010529043B2

(12) United States Patent
Knotts et al.

(10) Patent No.: US 10,529,043 B2
(45) Date of Patent: Jan. 7, 2020

(54) HIGHER EDUCATION DATA MODEL SYSTEMS AND NETWORKS, AND METHODS OF ORGANIZING AND OPERATING THE SAME

(71) Applicant: Ellucian Company L.P., Malvern, PA (US)

(72) Inventors: James Brian Knotts, Blue Bell, PA (US); John Laird Kopcke, Roswell, GA (US)

(73) Assignee: Ellucian Company L.P., Malvern, PA (US)

( * ) Notice: Subject to any disclaimer, the term of this patent is extended or adjusted under 35 U.S.C. 154(b) by 254 days.

(21) Appl. No.: 15/180,715

(22) Filed: Jun. 13, 2016

(65) Prior Publication Data

US 2016/0371805 A1 Dec. 22, 2016

Related U.S. Application Data

(60) Provisional application No. 62/180,252, filed on Jun. 16, 2015.

(51) Int. Cl.
*G06Q 50/20* (2012.01)
*G06F 16/21* (2019.01)

(52) U.S. Cl.
CPC .......... *G06Q 50/20* (2013.01); *G06F 16/211* (2019.01)

(58) Field of Classification Search
CPC ............................. G06Q 50/20; G06F 16/211
See application file for complete search history.

(56) References Cited

U.S. PATENT DOCUMENTS

| 8,918,412 | B1* | 12/2014 | Jesurum | H04L 67/28 |
| | | | | 707/760 |
| 2001/0037333 | A1* | 11/2001 | Nishimura | G06Q 40/02 |
| 2008/0270166 | A1* | 10/2008 | Morin | G06Q 10/06 |
| | | | | 705/326 |
| 2008/0313225 | A1* | 12/2008 | Spicer | G06F 17/30292 |
| 2012/0226590 | A1* | 9/2012 | Love | G06Q 10/10 |
| | | | | 705/30 |
| 2013/0226674 | A1* | 8/2013 | Field | G06Q 50/20 |
| | | | | 705/7.38 |
| 2015/0095357 | A1* | 4/2015 | Demo | G06F 17/30091 |
| | | | | 707/758 |
| 2015/0206074 | A1* | 7/2015 | Miller | G06F 17/30392 |
| | | | | 707/792 |

* cited by examiner

*Primary Examiner* — Jay A Morrison
(74) *Attorney, Agent, or Firm* — Stradley Ronon Stevens & Young, LLP

(57) ABSTRACT

A method of organizing higher education data is provided. The method includes: (a) providing a plurality of higher education data sources, each of the plurality of higher education data sources including respective higher education data organized using corresponding higher education identifiers; and (b) generating a single higher education identifier organizational structure for accessing the respective higher education data from each of the plurality of higher education data sources.

13 Claims, 8 Drawing Sheets

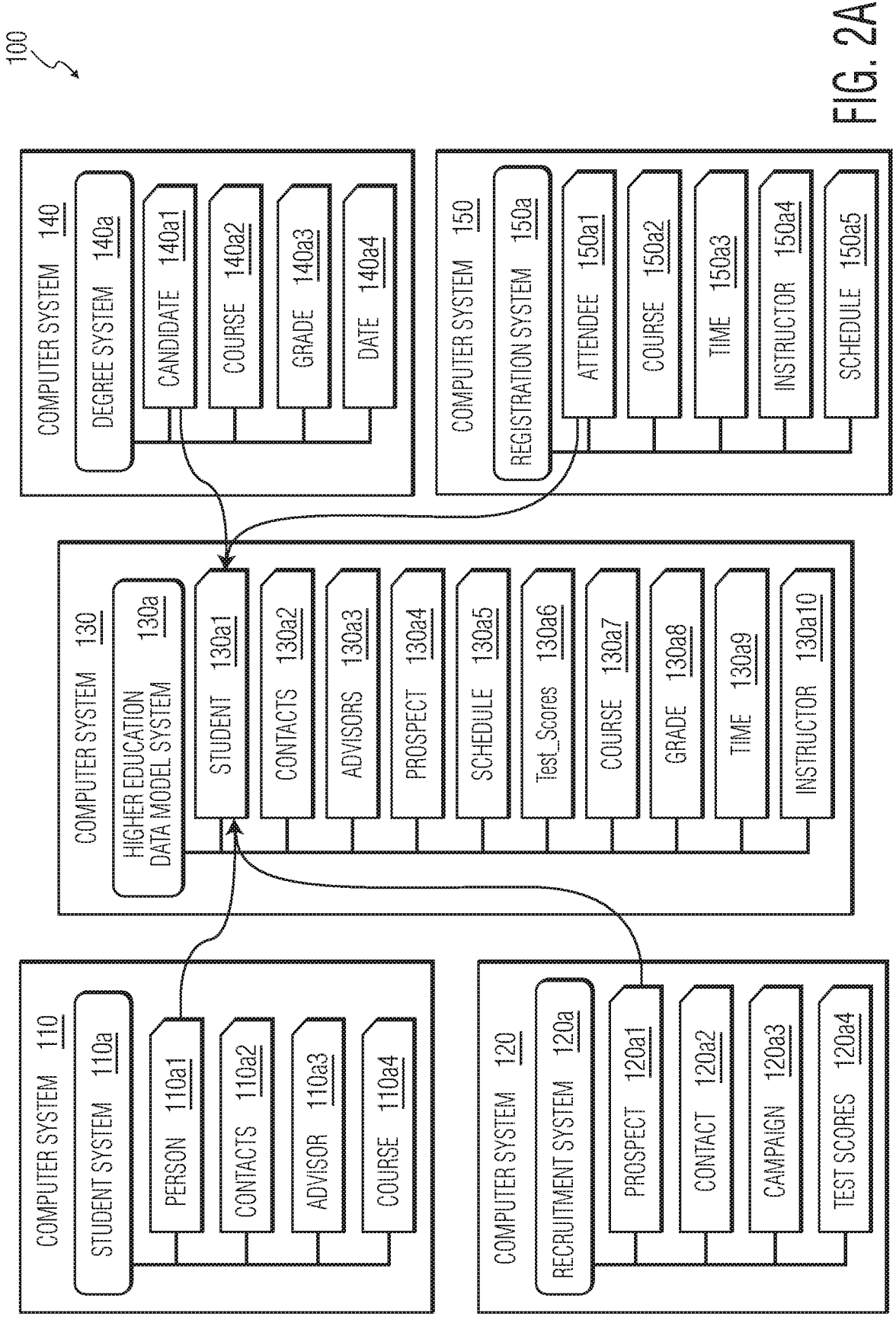

HIGHER EDUCATION DATA MODEL SYSTEMS AND NETWORKS, AND METHODS OF ORGANIZING AND OPERATING THE SAME

CROSS-REFERENCE TO RELATED APPLICATION

This application claims the benefit of U.S. Provisional Patent Application No. 62/180,252, filed Jun. 16, 2015, the content of which is incorporated herein by reference.

FIELD

The invention relates to higher education data systems, and more particularly, to improved organization of such systems.

BACKGROUND

A challenge facing higher education institutions (e.g., universities, colleges, etc.) is that there is typically a large number of data models needed to support each institution. Typically, each application used on campus has a uniquely defined data structure with little to no commonality between the various data structures. This results in several complexities.

One complexity is that it tends to be very difficult to have the systems within an institution share information among themselves. Interoperability (i.e., the ability for a process to span more than one system) is virtually impossible without a significant investment in complex technology. Another complexity is that it tends to be nearly impossible to understand which system is the true system of record in terms of analyzing information. As a result of these complexities, the ability for an institution to manage their operations through the use of complex data analysis is currently very limited.

Thus, it would be desirable to provide improved methods of organizing higher education data, and improved higher education data networks.

SUMMARY

According to an exemplary embodiment of the invention, a method of organizing higher education data is provided. The method includes: (a) providing a plurality of higher education data sources, each of the plurality of higher education data sources including respective higher education data organized using corresponding higher education identifiers; and (b) generating a single higher education identifier organizational structure for accessing the respective higher education data from each of the plurality of higher education data sources.

According to another exemplary embodiment of the invention, a higher education data network is provided. The higher education data network includes a plurality of data sources, each of the plurality of higher education data sources includes respective higher education data organized using corresponding higher education identifiers. The higher education data network also includes a computer system including a single higher education identifier organizational structure for accessing the respective higher education data from each of the plurality of higher education data sources.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIGS. 2A-2B, 3A-3B, and 4A-4B are block diagrams illustrating another higher education data network in accordance with various exemplary embodiments of the invention.

DETAILED DESCRIPTION

Figure 1:
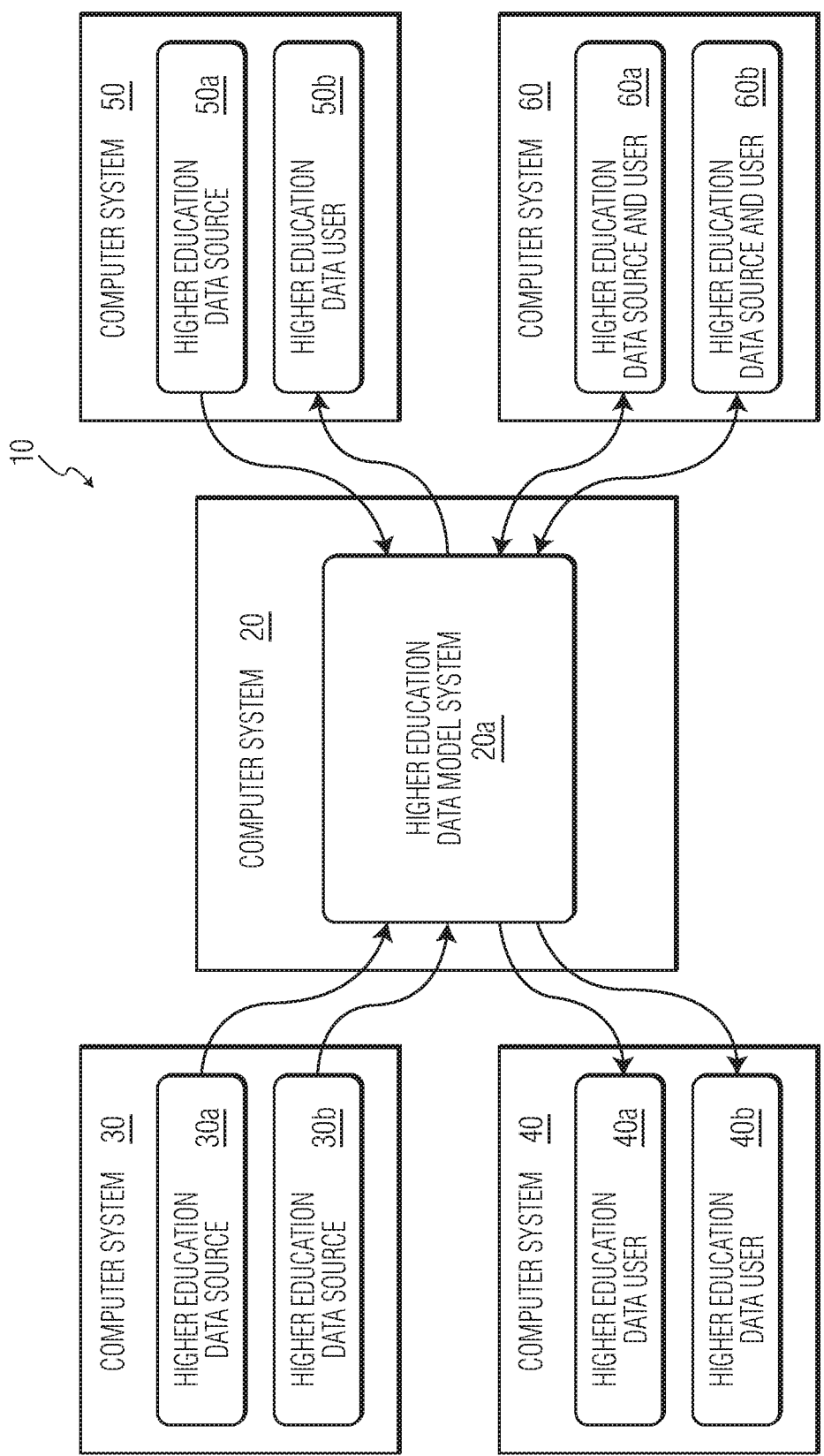
FIG. 1 is a block diagram illustrating a higher education data network in accordance with an exemplary embodiment of the invention.

According to aspects of the invention, a data model is provided for normalizing various higher education data structures so information from disparate systems can be joined and analyzed together. This allows higher education users (and higher education software applications) to share a standard language and/or format that can be used across an institution, as well as between institutions and industry partners. The result is a comprehensive view that enables higher education institutions to better understand and make use of higher education data (e.g., to support student success), which is key during this age of massive shifts in the higher education landscape.

In accordance with the invention, exemplary higher education data models are built on a common language (e.g., standardized nomenclature, familiar to every user/institution using the model) which allows common viewing and collaboration, thereby improving the entire student experience. Such higher education data models may create a single view of the data that different applications (e.g., software applications) on campus can share (and act on) beginning at the recruitment phase, and continuing through matriculation, alumni activities, etc. Such higher education data models may also create an open format for learning and sharing within the relevant community universities, etc., where open standards grow and expand through continued use. Further, the inventive higher educations data models may allow institutions (and communities within an institution) to personalize their data model(s), thereby minimizing the need to make modifications to the systems of the institution.

The inventive higher education data models are a game changer for the higher education industry and community. An open standard, community-based higher education data model may be created to allow institutions to capitalize on the unprecedented amount of information being created every day. The higher education data model(s) unlocks that data, simplifies the complexity of accessing the data, and allows systems and applications to communicate with one another in an efficient manner. Such university systems and applications may also use the higher education data models to pull in data from government sources, analysts, online learning systems, etc., which is made possible by the inventive data integration systems and techniques.

As used herein, the terms "computer" and "computer system" are intended to be broadly defined. For example, the term may refer to a single computer system (such as a server) or to a group of computer systems, etc. Further, the terms may refer to any computer (e.g., microprocessor based) device such as desktop computers, laptop computers, tablets, hand held computer devices, smart phones, etc. The connection(s) between such computers and computer systems (e.g., used to provide, access, and/or retrieve data) may be wired, wireless, cloud-based, amongst others.

As used herein, the term "data source" is intended to be broadly defined to refer to any source of data accessible by a computer or a computer system. Such a data source may include a database(s), a look-up table(s), or any other type of data structure(s). Further, a data source may refer to an application that accesses data. Further still, a data source may include a software application for accessing higher education data stored in the data source.

Referring now to the drawings, FIG. 1 is a block diagram illustrating a higher education data network 10. Network 10 includes computer systems 20, 30, 40, 50 and 60. Computer system 20 includes higher education data model system 20a. Higher education data model system 20a (including software) provides a single higher education identifier organizational structure for accessing the respective higher education data from each of a plurality of higher education data sources. For example, higher education data model system 20a provides a mechanism for higher education data sources to provide higher education data to higher education data users using an inventive organizational structure. Higher education data sources 30a, 30b reside on (or are accessible by) computer system 30, and provide higher education data to higher education data users via higher education data model system 20a on computer system 20. This data transmission from higher education data sources 30a, 30b is illustrated by the lines with arrow heads directed from higher education data sources 30a, 30b to higher education data model system 20a.

As opposed to the higher education data sources that provide higher education data from computer system 30, higher education data users 40a, 40b access (and use) higher education data from higher education data model system 20a via computer system 40. This data transmission from (or via) higher education data model system 20a on computer system 20 is illustrated by the lines with arrow heads directed to data users 40a, 40b from higher education data model system 20a. Of course, the data transmission (and other data transmissions described herein) may be through a wired connection, a wireless connection, etc.

It is understood that a computer system in higher education data network 10 may involve higher education data sources providing higher education data, and higher education data users accessing (and using) higher education data. Computer system 50 is an example of such a system. Higher education data source 50a resides on (or is accessible by) computer system 50, and provides higher education data to higher education data users via higher education data model system 20a on computer system 20. This data transmission from data source 50a is illustrated by the line with an arrow head directed from data source 50a to higher education data model system 20a. Further, higher education data user 50b accesses (and uses) higher education data from higher education data model system 20a via computer system 50. This data transmission from (or via) higher education data model system 20a on computer system 20 is illustrated by the line with an arrow head directed to data user 50b from higher education data model system 20a.

It is further understood that a computer system in higher education data network 10 may involve combined higher education data sources/users. Computer system 60 is an example of such a system. Higher education data sources/users 60a, 60b reside on (or are accessible by) computer system 60, and provide higher education data to higher education data users via higher education data model system 20a on computer system 20. This data transmission from higher education sources/users 60a, 60b is illustrated by the lines with arrow heads directed from higher education data sources/users 60a, 60b to higher education data model system 20a. The lines with arrow heads between higher education data model system 20a and higher education sources/users 60a, 60b are double headed—illustrating that higher education is also transmitted from (or via) higher education data model system 20a to higher education sources/users 60a, 60b.

Thus, FIG. 1 illustrates a higher education data network 10 where: higher education data sources provide higher education data to higher education data users via higher education data model system 20a; higher education data users access higher education data from higher education data sources via higher education data model system 20a; and combined higher education data sources/users provide and access higher education data via higher education data model system 20a.

Figure 2B:
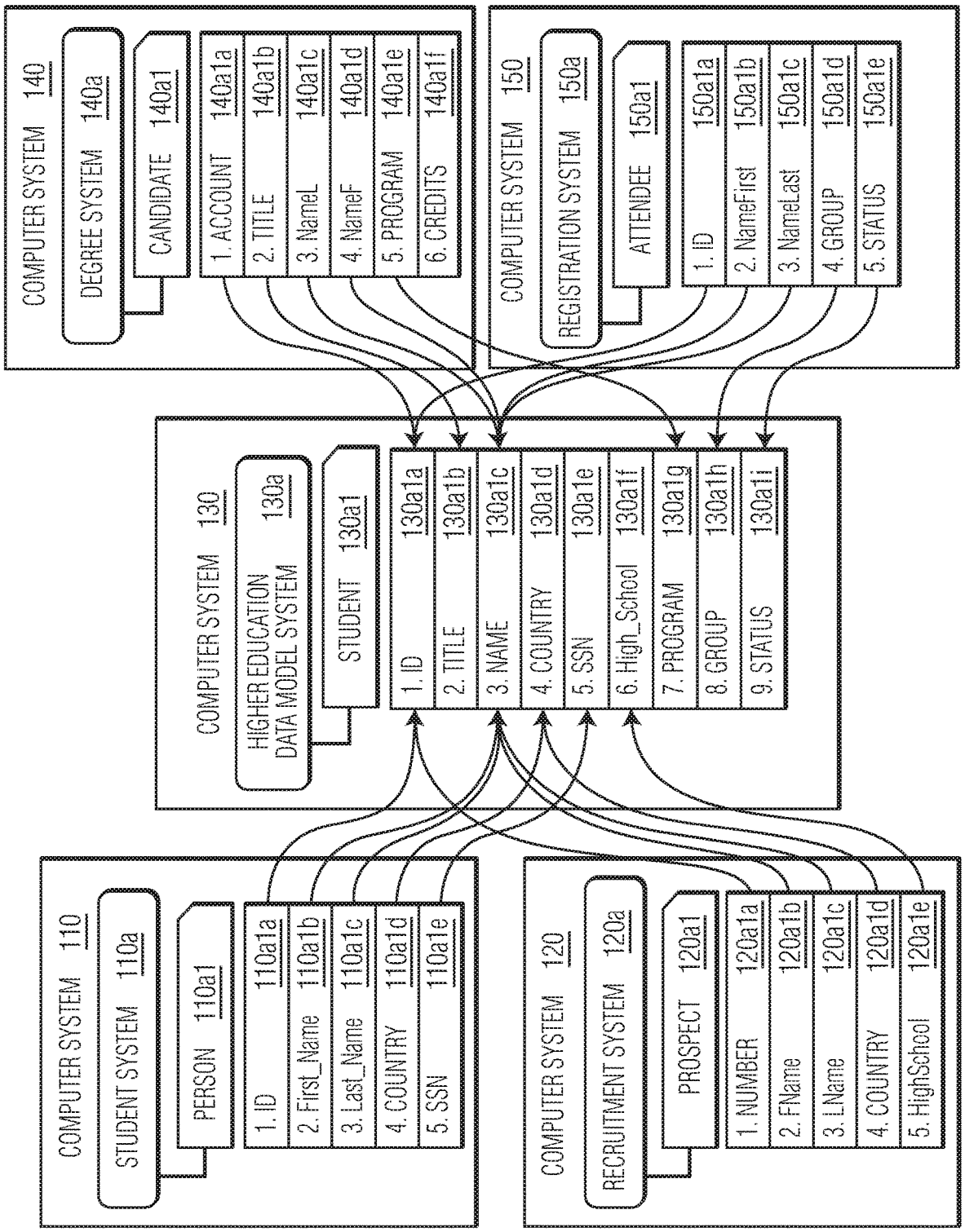

FIGS. 2A-2B, 3A-3B, and 4A-4B illustrate a more detailed implementation of an exemplary higher education data network 100. Referring specifically to FIG. 2A, an exemplary aspect of the invention is illustrated related to the identifier "student." That is, different higher education data sources/users format information (e.g., in data fields) differently from one another. Higher education data model system 20a provides a structure to organize (e.g., to provide and/or access) higher education data regardless of the manner in which the data is provided. FIGS. 2A-2B illustrate an exemplary aspect of higher education data model system 20a related to the identifier "student".

Higher education data network 100 shown in FIG. 2A includes a computer system 110. Computer system 110 includes a plurality of data sources (e.g., an application including data structures, etc.), where one of the data sources is shown as student system 110a. Student system 110a includes higher education data organized using a plurality of higher education identifiers including: "PERSON" 110a1; "CONTACTS" 110a2; "ADVISOR" 110a3; and "COURSE" 110a4.

FIG. 2A also illustrates computer system 120 including a data source recruitment system 120a. Recruitment system 120a includes higher education data organized using a plurality of higher education identifiers including: "PROSPECT" 120a1; "CONTACT" 120a2; "CAMPAIGN" 120a3; and "TEST SCORES" 120a4. FIG. 2A also illustrates computer system 140 including a data source degree system 140a. Degree system 140a includes higher education data organized using a plurality of higher education identifiers including: "CANDIDATE" 140a1; "COURSE" 140a2; "GRADE" 140a3; and "DATE" 140a4. FIG. 2A also illustrates computer system 150 including a data source registration system 150a. Registration system 150a includes higher education data organized using a plurality of higher education identifiers including: "ATTENDEE" 150a1; "COURSE" 150a2; "TIME" 150a3; "INSTRUCTOR" 150A4; and "SCHEDULE" 150a5.

In FIG. 2A, each of computer systems 110, 120, 140, and 150 includes an identifier related to the identity of a person, where that person ultimately may become a student at a university/college. On computer system 110, in student system data source 110a, there is identifier "PERSON" 110a1. On computer system 120, in recruitment system data source 120a, there is identifier "PROSPECT" 120a1. On computer system 140, in degree system data source 140a, there is identifier "CANDIDATE" 140a1. On computer system 150, in registration system data source 150a, there is identifier "ATTENDEE" 150a1. Each of these identifiers has a format that is specific to the application and/or data source to which it applies. For example, the identifers of data source student system 110a may utilize certain information (e.g., certain fields of information) in a predetermined format. FIG. 2B illustrates the "drilled down" format of identifiers "PERSON" 110a1 (in data source student system 110a), "PROSPECT" 120a1 (in data source requirement system 120a), "CANDIDATE" 140a1 (in data source degree system 110a), and "ATTENDEE" 150a1 (in data source registration system 150a). As can be seen in FIG. 2B, each of these identifiers has a specific group of data fields organized in a predetermined format (e.g., identifier "PERSON" 110a1 includes data fields "ID" 110a1a, "First Name" 110a1b, "Last Name" 110a1c, "COUNTRY" 110a1d, and "SSN" 110a1e). If a higher education data user desires to retrieve data from one of these identifiers, a complexity exists in the data format. Typically, software is written to specifically link the format of the identifiers with the user application to which the data will be linked. According to the exemplary embodiment of the invention illustrated in FIGS. 2A-2B, higher education data model system 130a is provided on computer system 130. Higher education data model system 130a provides a single higher education identifier organizational structure for accessing higher education data from each of the higher education data sources in network 100 including computer systems 110, 120, 140, and 150. Higher education data model system 130a includes unique higher education identifiers including "STUDENT" 130a1, "CONTACTS" 130a2, etc. Each of these unique higher education identifiers includes a data structure (and format) intended to provide access to the corresponding data in the various data sources of network 100 that is relevant to the identifier.

For example, each of the plurality of higher education identifiers including "PERSON" 110a1, "PROSPECT" 120a1, "CANDIDATE" 140a1, and "ATTENDEE" 150a1 relate to a person who is, or may become, a student at a university/college. The data fields associated with each of these identifiers are shown in FIG. 2B. In the inventive higher education data model 130a, a unique identifier "STUDENT" 130a1 has been generated, where identifier 130a1 includes a group of data fields corresponding to the collective various data fields of identifiers "PERSON" 110a1, "PROSPECT" 120a1, "CANDIDATE" 140a1, and "ATTENDEE" 150a1. FIG. 2B illustrates the mapping of the data fields from identifiers "PERSON" 110a1, "PROSPECT" 120a1, "CANDIDATE" 140a1, and "ATTENDEE" 150a1 to the corresponding data fields from identifier "STUDENT" 130a1. This mapping shows the individual data fields of identifiers "PERSON" 110a1, "PROSPECT" 120a1, "CANDIDATE" 140a1, and "ATTENDEE" 150a1 being mapped to data fields of identifier "STUDENT" 130a1. By providing this mapping, any existing (or new) data user of network 100 may access higher education data in (or accessible through) any application/data source at any location in network 100 using the higher education identifier organizational structure of higher education data model system 130a.

Figure 3A:
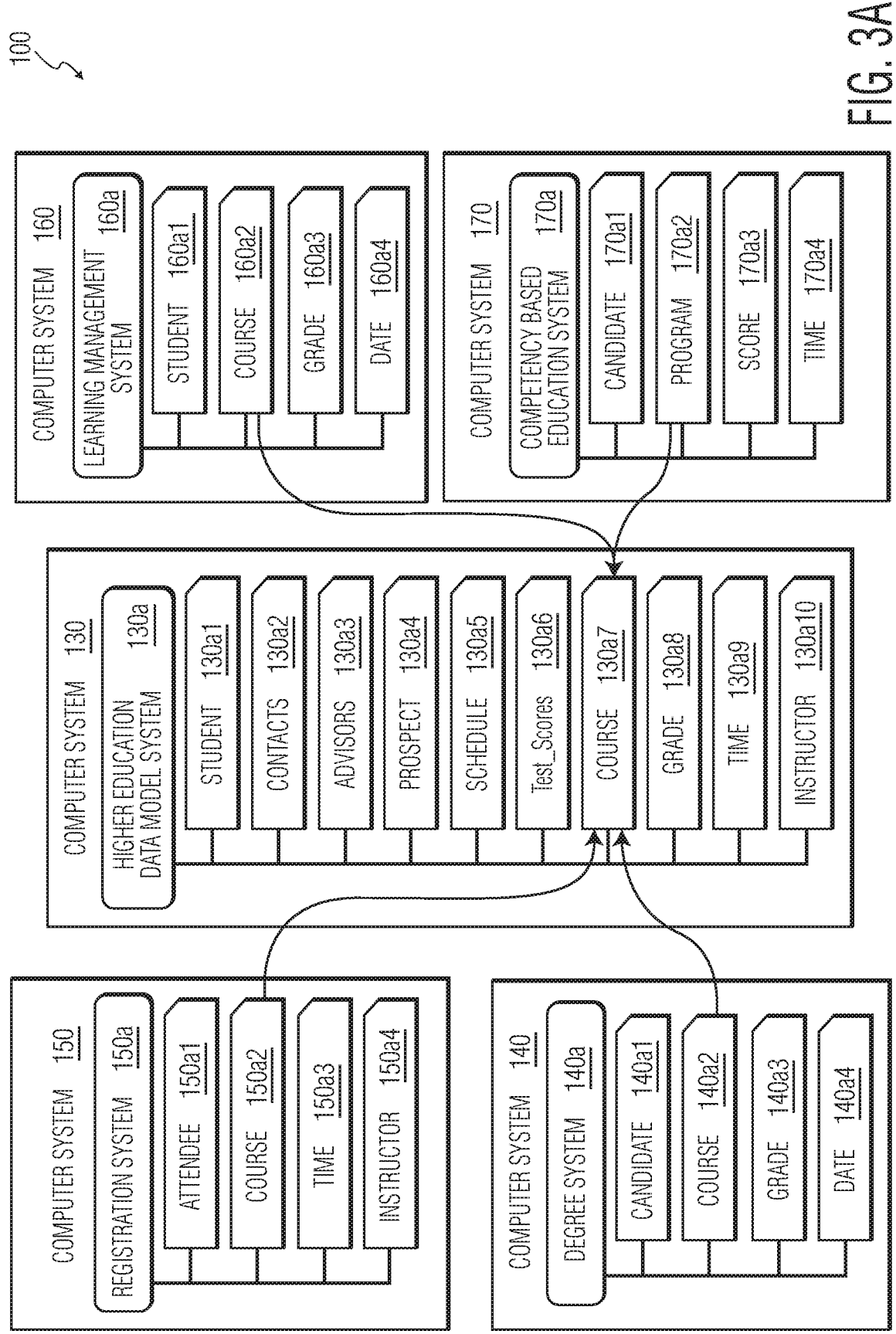
Figure 3B:
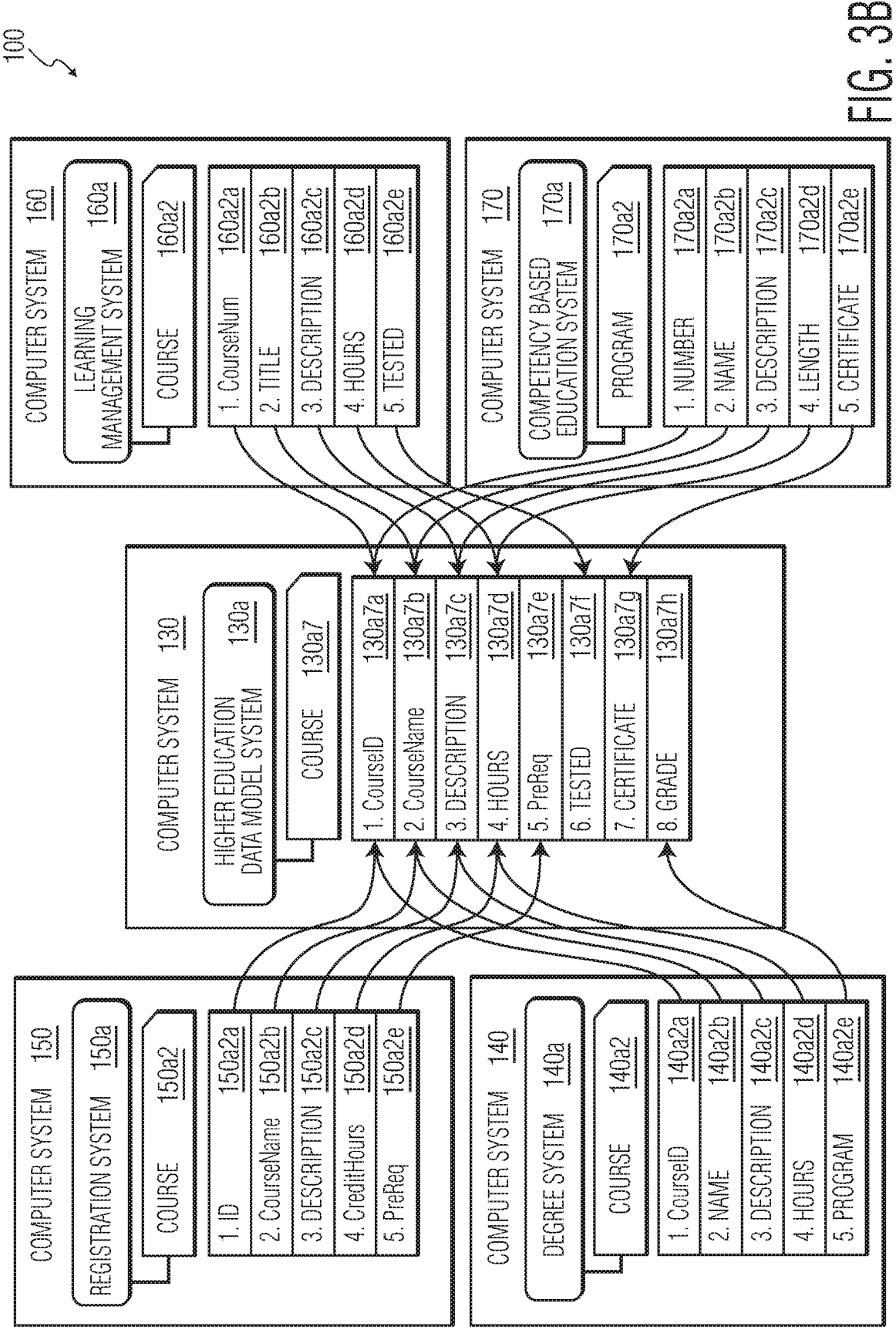

As explained above, the exemplary mapping provided in FIGS. 2A-2B relates to identifiers mapped via the unique identifier "STUDENT" 130a via higher education data model system 130a. However, there are many different identifiers used in higher education. FIGS. 3A-3B relate to another example. FIG. 3A illustrates computer systems 130, 140, and 150, all of which were previously illustrated and described in connection with FIGS. 2A-2B. Also shown in FIGS. 3A-3B are computer systems 160 and 170. Each of computer systems 140, 150, 160, and 170 include a data source having an identifier related to a "COURSE". Specifically: data source degree system 140a includes identifier "COURSE" 140a2; data source registration system 150a includes identifier "COURSE" 150a2; data source learning management system 160a includes identifier "COURSE" 160a2; and data source competency based education system 170a includes identifier "PROGRAM" 170a2. As shown in FIG. 3A, higher education data model system 130a includes unique identifier course 130a7. As shown in FIG. 3B, individual ones of the data fields of identifiers 140a2, 150a2, 160a2, and 170a2 are mapped to individual ones of the data fields of identifier 130a7.

Figure 4A:
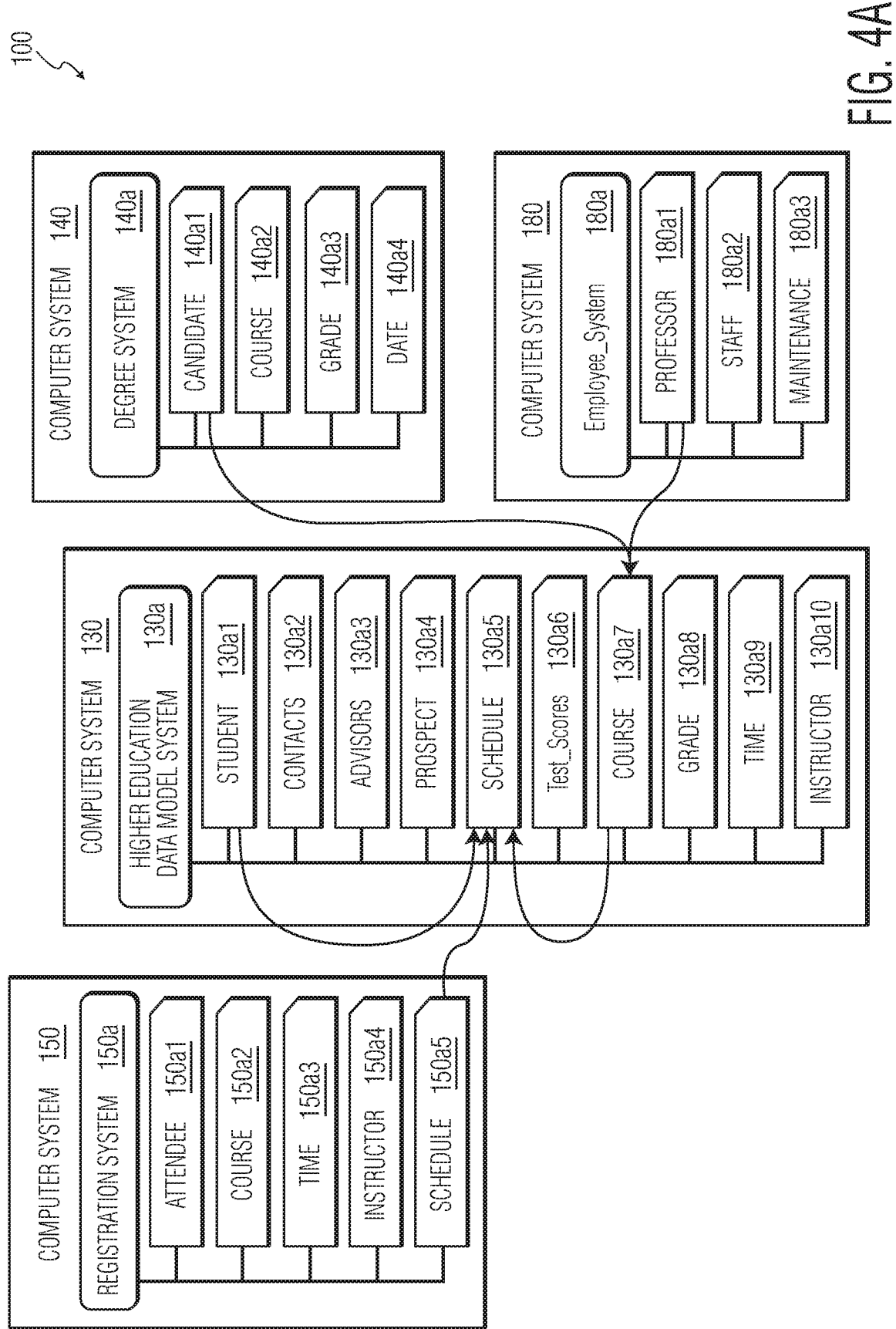
Figure 4B:
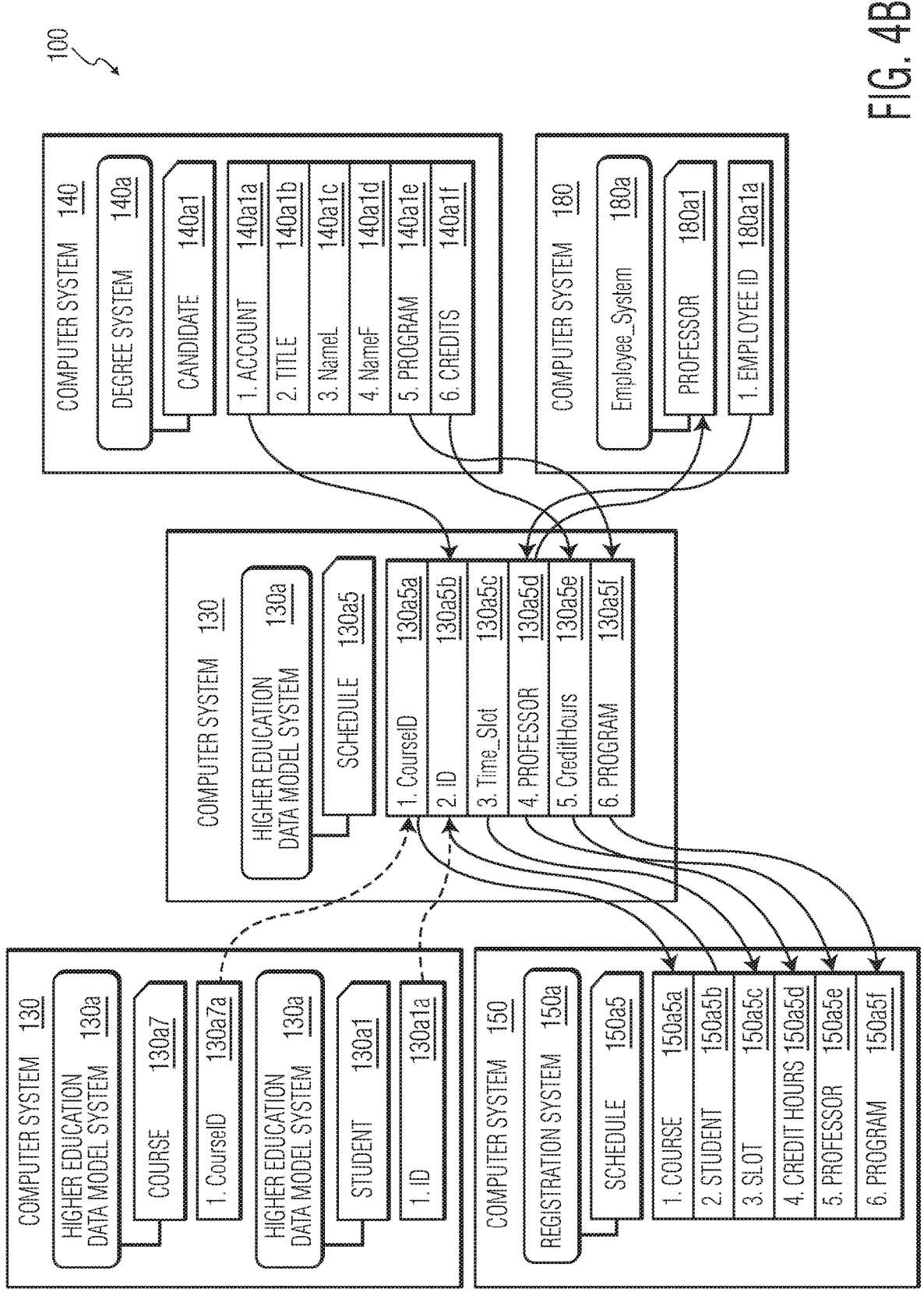

Thus, FIGS. 2A-2B and FIGS. 3A-3B relate to the mapping of identifiers related to "STUDENT" and "COURSE". The examples shown in FIGS. 2A-2B and FIGS. 3A-3B simply illustrate mapping of data provided from the data sources into the higher education data model system 130a (as shown by the line with arrow heads all directed toward system 130a). However, it is understood that the mapping may be used in connection with providing or accessing/receiving data. FIG. 4A illustrates computer systems 130, 140, and 150, all of which were previously illustrated and described in connection with FIGS. 2A-2B. Also shown in FIGS. 4A-4B is computer system 180. Each of computer systems 140, 150, and 180 (as well as computer system 130) includes a data source used in assembling the unique identifier "SCHEDULE" 130a5. Specifically: data source degree system 140a includes identifier "CANDIDATE" 140a1 mapped to identifer "SCHEDULE" 130a5; data source registration system 150a includes identifier "SCHEDULE" 150a5 mapped to identifer "SCHEDULE" 130a5; data source employee system 180a includes identifier "PROFESSOR" 180a1 mapped to identifer "SCHEDULE" 130a5; and higher education data model system 130a includes identifiers "STUDENT" 130a1 and "COURSE" 130a7 mapped to identifer "SCHEDULE" 130a5. As shown in FIG. 4B, individual ones of the data fields of identifiers 130a1, 130a7, 140a1, 150a5, and 180a1 are mapped to individual ones of the data fields of identifier 130a5. FIG. 4B illustrates that the mapping of the data fields may be in either or both directions with respect to the data fields of identifier "SCHEDULE" 130a5.

Figure 5:
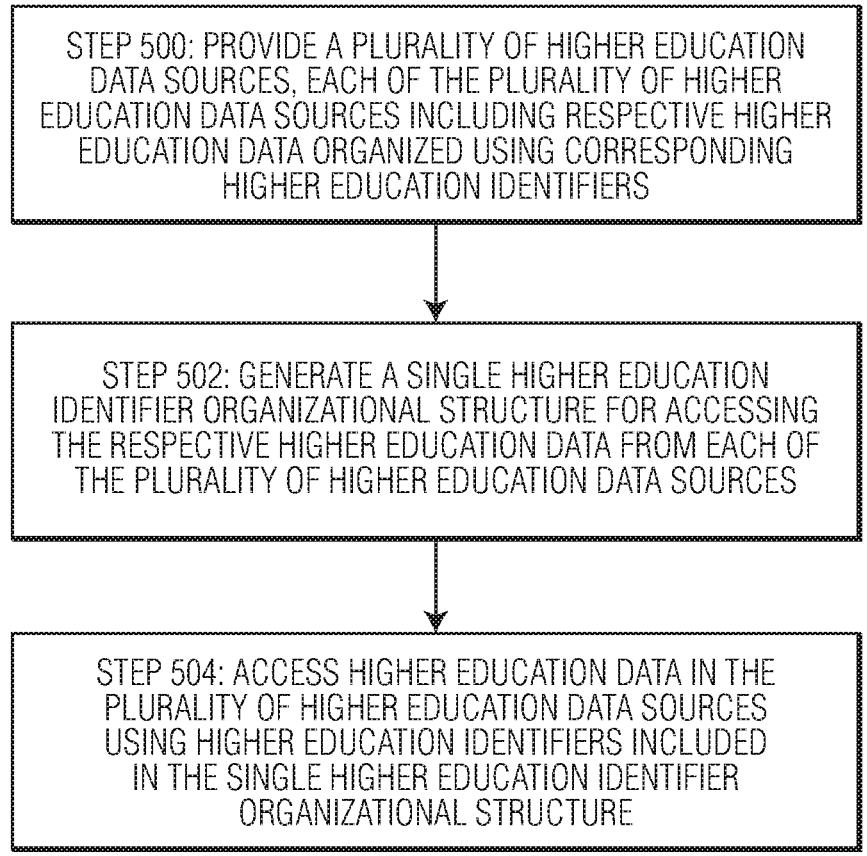
FIG. 5 is a flow diagram illustrating a method of organizing higher education data in accordance with an exemplary embodiment of the invention.

FIG. 5 is a flow diagram in accordance with certain exemplary embodiments of the invention. As is understood by those skilled in the art, certain steps included in the flow diagram may be omitted; certain additional steps may be added; and the order of the steps may be altered from the order illustrated.

FIG. 5 is a flow diagram illustrating a method of organizing higher education data. At Step 500, a plurality of higher education data sources are provided. Each of the plurality of higher education data sources includes respective higher education data organized using corresponding higher education identifiers. For example, computer system 30, computer system 50, and computer system 60, all shown in FIG. 1, includes respective higher education data sources (e.g., higher education data sources 30a, 30b, 50a, 60a, and 60b—all shown in FIG. 1). Likewise, FIGS. 2A-2B illustrate data sources 110a, 120a, 140a, and 150a (i.e., data source student system 110a, data source recruitment system 120a, data source degree system 140a, and data source registration system 150a).

At Step 502, a single higher education identifier organizational structure for accessing the respective higher education data from each of the plurality of higher education data sources is generated. For example, FIG. 1 illustrates an example of such a higher education identifier organizational structure via higher education data model system 20*a*. Likewise, FIGS. 2A-2B illustrate another example of such a higher education identifier organizational structure via higher education data model system 130*a*.

At Step 504, higher education data in the plurality of higher education data sources is accessed using higher education identifiers included in the single higher education identifier organizational structure. For example, such access of the higher education data is illustrated by lines with arrow heads in the various drawings included herein.

While the invention is illustrated and described primarily with respect to a discrete number of computers and data sources, it is understood that this is for ease of illustration. In actual practice, every user in a higher education system (e.g., a university) may be a link in a higher education data model system (e.g., as a user of higher education data, as a source of higher data, as both a user and a source of higher education data, etc). Thus, many hundreds or thousands of computers or computer devices may be included in a higher education data network in accordance with the invention.

Thus, according to the invention, higher education data models are generated that provide a comprehensive view of the vast amounts of data surrounding each student (and other participants in the higher education community) as colleges and universities gather more and more information on individual students, and as the colleges and universities invest in a growing array of software systems that will enable them to better understand, reconcile, and make use of such data. The inventive higher education data models tend to act as a language translation service, standardizing data across many higher education systems to provide a single, high-definition snapshot of the student (and/or other higher education participant). This provides college and university leaders with new insight into what is driving their students forward, and what is holding them back.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of organizing higher education data, the method comprising the steps of:
   (a) providing a plurality of higher education data sources, each of the plurality of higher education data sources including respective higher education data organized using corresponding higher education identifiers, one of the higher education identifiers in a first of the higher education data sources includes data being organized in a first plurality of data fields, one of the higher education identifiers in a second of the higher education data sources includes data being organized in a second plurality of data fields, the first plurality of data fields being at least partially different from the second plurality of data fields;
   (b) generating a single higher education identifier organizational structure for accessing the respective higher education data from each of the plurality of higher education data sources, the single higher education identifier organizational structure including unique higher education identifiers, and wherein at least one of the unique higher education identifiers includes a plurality of data fields corresponding to both the first plurality of data fields and the second plurality of data fields, wherein at least one of the plurality of data fields in the unique higher education identifiers corresponding to a data field of each of the first plurality of data fields and the second plurality of data fields;
   (c) obtaining higher education data related to prospects or candidates using bidirectional mapping between the plurality of higher education sources and the single higher-education identifier organizational structure; and
   (d) using the higher education data obtained in step (d) in connection with recruiting of the prospects or candidates.

2. The method of claim 1 further comprising the step of accessing higher education data in the plurality of higher education data sources using higher education identifiers included in the single higher education identifier organizational structure.

3. The method of claim 2 wherein the step of accessing higher education data in the plurality of higher education data sources is performed using a single application.

4. The method of claim 1 wherein the single higher education identifier organizational structure includes unique higher education identifiers, the unique higher education identifiers including a student identifier and a course identifier.

5. The method of claim 1 further comprising the step of accessing higher education data in at least one of the plurality of higher education data sources using higher education identifiers included in the single higher education identifier organizational structure via a user of another of the plurality of higher education data sources.

6. The method of claim 1 wherein higher education data included in at least one of the plurality of higher education data sources includes data saved in one or more data structures, and accessible via a software application of the respective one of the plurality of higher education data sources.

7. The method of claim 1 further comprising the step of accessing, by a student of a higher education institution, higher education data in the plurality of higher education data sources using higher education identifiers included in the single higher education identifier organizational structure, the student accessing the higher education data using a portable electronic device selected from the group consisting of a laptop computer, a tablet, and a smart phone.

8. A higher education data system comprising:
   a plurality of data sources, each of the plurality of higher education data sources including respective higher education data organized using corresponding higher education identifiers, one of the higher education identifiers in a first of the higher education data sources includes data being organized in a first plurality of data fields, one of the higher education identifiers in a second of the higher education data sources includes data being organized in a second plurality of data fields, the first plurality of data fields being at least partially different from the second plurality of data fields; and
   a microprocessor based computer system including a single higher education identifier organizational structure for accessing the respective higher education data from each of the plurality of higher education data sources, the single higher education identifier organizational structure including unique higher education identifiers, and wherein at least one of the unique higher education identifiers includes a plurality of data fields corresponding to both the first plurality of data fields and the second plurality of data fields, wherein at least one of the plurality of data fields in the unique higher education identifiers corresponding to a data field of each of the first plurality of data fields and the second plurality of data fields, wherein the higher education data system is configured such that a user (i) obtains higher education data related to prospects or candidates using bidirectional mapping between the plurality of higher education sources and the single higher-education identifier organizational structure, and (ii) uses the obtained higher education data in connection with recruiting of the prospects or candidates.

9. The higher education data system of claim 8 wherein the plurality of data sources are networked with the microprocessor based computer system such that higher education data in the plurality of higher education data sources is accessible using higher education identifiers included in the single higher education identifier organizational structure.

10. The higher education data system of claim 8 wherein the unique higher education identifiers include a student identifier and a course identifier.

11. The higher education data system of claim 8 further comprising a plurality of computer devices for accessing higher education data from each of the plurality of data sources.

12. The higher education data system of claim 8 wherein the plurality of computer devices includes a plurality of student computer devices.

13. The higher education data system of claim 8 wherein the microprocessor based computer system including the single higher education identifier organizational structure includes a plurality of computer systems.

* * * * *